Patented Apr. 18, 1933                                                              1,903,868

UNITED STATES PATENT OFFICE

WILHELM LOMMEL, OF LEVERKUSEN-WIESDORF, AND RUDOLF ENGELHARDT, OF LEVERKUSEN-I. G.-WERK, GERMANY, ASSIGNORS TO I. G. FARBENINDUSTRIE AKTIENGESELLCHAFT, OF FRANKFORT-ON-THE-MAIN, GERMANY

PROCESS OF PREPARING ALKYL ESTERS OF CARBOXYLIC ACIDS

No Drawing. Application filed June 4, 1931, Serial No. 542,202, and in Germany June 16, 1930.

The present invention relates to a process of preparing alkyl esters of carboxylic acids.

In accordance with the present invention alkyl esters of carboxylic acids, for example, ethyl-, propyl- and butyl-esters of mono- and poly-basic saturated or unsaturated aliphatic acids, such as esters of formic acid, acetic acid, butyric acid, crotonic acid, lauric acid and succinic acid, and of aromatic carboxylic acids, such as of benzoic acid, are prepared in a technically advantageous manner by causing the corresponding alkyl- or di-alkyl sulfuric acid to react with a corresponding carboxylic acid under such conditions that no free sulfuric acid is present during the esterification process; that means, the free sulfuric acid which is eventually contained in the starting alkyl sulfuric acid and the sulfuric acid which is deliberated in the esterification process are bound, but care is to be taken that during the process an acid reaction, favorably a reaction acid to Congo, prevails in the reaction mixture, which is achieved by not completely transforming into a neutral sulfate the free sulfuric acid present in the starting alkyl sulfuric acid and formed during the esterification.

Obviously this can be attained by various means; thus for example, to the mixtures of alkyl esters of sulfuric acid and sulfuric acid as are obtainable by absorption in sulfuric acid of gases containing olefines and of the carboxylic acid to be esterified suitable salts binding the free sulfuric acid are added in such a quantity that any free sulfuric acid which may already be present and which may be produced during the process is fixed in the form of bisulfates or of polysulfates or of neutral sulfates + bisulfates. As salts coming into consideration for the purpose of our invention there may be mentioned neutral salts, favorably those of non-volatile acids, for example, of sulfuric acid and phosphoric acid, and such acid salts which are capable to bind the free sulfuric acid, that means, in case a salt of a tribasic acid is used there come into consideration the secondary and tertiary salts thereof, for example, di- or tri-sodium or -ammonium phosphate.

The process can also be carried out, for example, by adding a basic reacting substance to the reaction mixture combining with free sulfuric acid present in the starting alkyl sulfuric acid, for example, magnesium oxide, sodium carbonate or the like, in a quantity about equivalent to the free sulfuric acid and then adding a neutral or acid salt of the kind referred to above in a quantity sufficient for binding the sulfuric acid deliberated during the esterification.

The addition of ammonium sulfate has been found to be particularly advantageous since the reaction mass can then be stirred particularly easily and the ammonium bisulfate formed can be used for the washing out of ammonia from the crude gas containing olefines with the result that the sulfuric acid is fully utilized.

A good utilization of the sulfuric acid is likewise attained, for example, by the use of phosphorite, since the sulfuric acid is thereby utilized for converting the phosphorite into superphosphate.

The process is carried out by causing the components to react together, favorably with low heating at a temperature at which none of the components present or formed in the reaction mixture distils off, if desired, with the application of superatmospheric pressure, and finally distilling off the carboxylic acid ester formed by raising the temperature, if desired, under reduced pressure. A preferred method of carrying out the process on a technical scale is by mixing the components and, if desired after stirring the mixture for some time at room temperature, slowly heating to the temperature at which the ester distils off and keeping at this temperature until the ester is driven off.

The invention is illustrated by the following examples, without being limited thereto:

*Example 1.*—65 parts by weight of a mixture of ethyl- and di-ethyl sulfuric acid, obtained by the treatment of 53 parts by weight of a 98% sulfuric acid with ethylene or gases containing ethylene and corresponding to 12 parts by weight of ethylene, are well mixed with 82 parts by weight of phosphorite (tricalcium phosphate). After the addition of 28.5 parts by weight of acetic acid, the whole is heated to 110–115° C. in a closed apparatus with a descending condenser while continuing the mixing. In the course of about 1 hour 80% of the theoretical yield of acetic acid ethylester distils.

*Example 2.*—80 parts by weight of the mixture used in Example 1 are heated to 75–80° C. with 105 parts by wieght of ammonium sulfate and 35 parts by weight of a 90% aqueous formic acid with thorough mixing in the apparatus above described. In the course of 1¼ hours 90% of the theoretical yield of formic acid ethylester distils.

*Example 3.*—When instead of the formic acid employed in Example 2, 40 parts by weight of glacial acetic acid are used and the mixture is heated to 130–140° C. under otherwise similar conditions 90% of the theoretical yield of acetic acid ethylester distils in the course of half an hour.

Similar results are obtained with the propyl- or butyl ester of sulfuric acid.

*Example 4.*—When 80 parts by weight of the mixture used in Example 1 are heated to 110–125° C. with 115 parts by weight of potassium sulfate and 100 parts by weight of a 40% aqueous acetic acid, 80% of the theoretical yield of acetic acid ethylester distils in the course of 3 hours.

*Example 5.*—50 parts by weight of the above ethyl sulfuric acid mixture are mixed with 70 parts by weight of ammonium sulfate and 50 parts by weight of benzoic acid and heated with or without the use of a vacuum until the benzoic acid ethylester distils.

*Example 6.*—100 parts by weight of an ethyl sulfuric acid mixture corresponding to 22 parts by weight of ethylene are stirred with 105 parts by weight of ammonium sulfate and, after the addition of 67 parts by weight of crotonic acid, are heated slowly to 60° C. while stirring. The apparatus is then connected to a descending condenser and receiver, evacuated and the crotonic acid ethylester is distilled by further heating to about 145° C.

*Example 7.*—A butyl sulfuric acid mixture produced from symmetrical butylene and 60° Bé. sulfuric acid and containing 22 parts by weight of butylene is mixed for a short time with 100 parts by weight of ammonium sulfate and, after the addition of 22 parts by weight of a 90% aqueous formic acid, is stirred first at ordinary temperature and then for some time at 50° C. On further heating, the formic acid butylester distils in a yield amounting to 86% of the theoretical.

*Example 8.*—50 parts by weight of an ethyl sulfuric acid mixture corresponding to 11.2 parts by weight of ethylene are mixed with 55 parts by weight of ammonium sulfate and 88 parts by weight of lauric acid and, after stirring thoroughly at about 100° C., are heated slowly in a vacuo to the distillation temperature, when the greater part of the ester distils at about 135° C.

In an analogous manner there can also be produced, for example, the succinic acid ester.

We claim:

1. The process which comprises causing an alkyl ester of sulfuric acid containing two to four carbon atoms in the alkyl group and a carboxylic acid to react upon each other with the addition of a neutral salt of an acid of the group consisting of sulfuric acid and phosphoric acid in a quantity sufficient for binding the free sulfuric acid present and formed in the reaction, thereby maintaining an acid reaction in the mixture, and distilling off the alkyl ester of the carboxylic acid.

2. The process which comprises causing an alkyl ester of sulfuric acid containing two to four carbon atoms in the alkyl group and a carboxylic acid to react upon each other with the addition of ammonium sulfate in a quantity sufficient for binding the free sulfuric acid present and formed in the reaction, thereby maintaining an acid reaction in the mixture, and distilling off the alkyl ester of the carboxylic acid.

3. The process which comprises causing ethyl ester of sulfuric acid and a monobasic aliphatic carboxylic acid to react upon each other with the addition of ammonium sulfate in a quantity sufficient for binding the free sulfuric acid present and formed in the reaction, thereby maintaining an acid reaction in the mixture, and distilling off the ethyl ester of the monobasic aliphatic carboxylic acid.

4. The process which comprises causing ethyl ester of sulfuric acid and acetic acid to react upon each other with the addition of ammonium sulfate in a quantity sufficient for binding the free sulfuric acid present and formed in the reaction, thereby maintaining an acid reaction in the mixture, and distilling off the ethyl ester of the acetic acid.

5. The process which comprises causing an alkyl ester of sulfuric acid containing two to four carbon atoms in the alkyl group and a carboxylic acid to react upon each other at a temperature between room temperature and the boiling point of the component of the lowest boiling point present in the reaction mixture with the addition of a neutral salt of an acid of the group consisting of sulfuric acid and phosphoric acid in a quantity sufficient for binding the free sulfuric acid present and formed in the reaction, thereby maintaining an acid reaction in the mixture and distilling off the alkyl ester of the carboxylic acid.

6. The process which comprises causing an alkyl ester of sulfuric acid containing two to four carbon atoms in the alkyl group and a monobasic aliphatic carboxylic acid to react upon each other at a temperature between room temperature and the boiling point of the component of the lowest boiling point present in the reaction mixture with the addition of ammonium sulfate in a quantity sufficient for binding the free sulfuric acid present and formed in the reaction, and distilling off the alkyl ester of the carboxylic acid.

7. The process which comprises causing an ethyl ester of sulfuric acid and acetic acid to react upon each other at a temperature between room temperature and the boiling point of the component of the lowest boiling point present in the reaction mixture with the addition of ammonium sulfate in a quantity sufficient for binding the free sulfuric acid present and formed in the reaction, and distilling off the ethyl ester of acetic acid.

In testimony whereof, we affix our signatures.

WILHELM LOMMEL.
RUDOLF ENGELHARDT.